United States Patent [19]

Sandiford

[11] 4,009,755
[45] Mar. 1, 1977

[54] SELECTIVELY CONTROLLING THE FLOW OF FLUIDS THROUGH SUBTERRANEAN FORMATIONS

[75] Inventor: Burton B. Sandiford, Placentia, Calif.

[73] Assignee: Union Oil Company of California, Brea, Calif.

[22] Filed: Mar. 17, 1976

[21] Appl. No.: 667,694

[52] U.S. Cl. .................. 166/270; 166/273; 166/295
[51] Int. Cl.² ................ E21B 43/22; E21B 33/138
[58] Field of Search .......... 166/295, 270, 273, 274, 166/292, 294

[56] References Cited

UNITED STATES PATENTS

| 3,306,870 | 2/1967 | Eilers et al. | 166/295 |
|---|---|---|---|
| 3,396,790 | 8/1968 | Eaton | 166/270 |
| 3,530,937 | 9/1970 | Bernard | 166/270 |
| 3,581,824 | 6/1971 | Hurd | 166/270 |
| 3,656,550 | 4/1972 | Wagner, Jr. et al. | 166/270 |
| 3,741,307 | 6/1973 | Sandiford | 166/292 X |
| 3,749,172 | 7/1973 | Hessert et al. | 166/270 X |
| 3,762,476 | 10/1973 | Gall | 166/270 X |
| 3,805,893 | 4/1974 | Sarem | 166/270 |
| 3,809,160 | 5/1974 | Routson | 166/295 X |
| 3,921,733 | 11/1975 | Clampitt | 166/270 X |

*Primary Examiner*—Stephen J. Novosad
*Attorney, Agent, or Firm*—Richard C. Hartman; Dean Sandford; Gerald L. Floyd

[57] ABSTRACT

A method of forming a combination plug in the more permeable zones of a subterranean formation of nonuniform permeability in which there is injected into the formation (1) aqueous solutions of a polymer and a material that reacts with the polymer to form a polymer-containing plug and (2) thereafter injecting aqueous solutions of an alkali metal silicate and a material that reacts with the silicate to form a silicate-containing plug.

34 Claims, No Drawings

SELECTIVELY CONTROLLING THE FLOW OF FLUIDS THROUGH SUBTERRANEAN FORMATIONS

BACKGROUND OF THE INVENTION

1. Field of the Invention

This invention relates to a method of plugging of the more permeable sections of subterranean formations having nonuniform permeability. More particularly, the invention relates to such a method to provide better control of fluids injected into a formation during enhanced oil recovery operations or withdrawn from a formation during production operations.

2. Description of the Prior Art

When fluids flow through formations having sections of varying permeability, a higher percentage of the fluids tends to flow through those sections having a higher permeability. It is often desired to decrease or stop the flow of fluids through these sections of higher permeability. For example, in the enhanced recovery of petroleum by flooding, a displacing fluid is injected into the formation via an injection well to displace the petroleum through the formation toward a producing well.

In the normal flooding operation, a maximum oil recovery is obtained when the driven fluid builds up in a wide band in front of the driving fluid which moves uniformly towards the producing well. To keep this bank of oil intact, and constantly moving towards the producing well, a substantially uniform permeability must exist throughout the strata. If this uniform permeability does not exist, or is not provided, the flooding fluid will seek the areas of high permeability, and channeling occurs with the consequent loss of some driving fluid energy and the appearance of excessive amounts of driving fluid in the producing well.

There is a tendency for the injected fluid to follow the path of least resistance, pass mostly through the portions of the formation having the highest permeability and bypass the petroleum present in the less permeable portions of the formation. If these high permeability zones of the formation were plugged, the injected fluid would be forced to flow into the less permeable portions of the formation and displace a higher percentage of the petroleum present in the entire formation. Similarly, in the production of oil, production wells sometimes produce water and/or gas along with oil. The water and gas often are produced through the portions of the formation having a relatively high permeability. If the zones through which water and gas are produced could be at least partially plugged, a higher percentage of the produced fluids would be the desired oil phase.

A wide variety of materials have been proposed for use in plugging subterranean formations. Injection of a solution of a polymer solution and a solution of a material, such as a multivalent metal cation, which reacts with the polymer to form a gel, agglomerate, precipitate or other plug is shown in U.S. Pat. No. 3,396,790 to Eaton, U.S. Pat. No. 3,799,262 to Knight, U.S. Pat. No. 3,581,824 to Hurd, U.S. Pat. No. 3,762,476 to Gall, U.S. Pat. No. 3,909,423 to Hessert et al., U.S. Pat. No. 3,795,276 to Eilers et al., U.S. Pat. No. 3,658,129 to Lanning et al. and U.S. Pat. No. 3,809,160 to Routson. Injection of a solution of an alkali metal silicate and a solution of a material which reacts with the silicate to form a gel or a plug is well-known as shown in many patents, such as U.S. Pat. No. 3,530,937 to Benard, U.S. Pat. No. 3,386,509 to Froning and U.S. Pat. No. 3,402,588 to Andresen. U.S. Pat. No. 3,741,307 to Sandiford et al. describes injection of a thickened aqueous polymer solution followed by a solution of a liquid agent which reacts in the formation to form a plugging material. An example of suitable reactants include sodium silicate and a delayed gelling agent therefor, such as ammonium sulfate. Another approach has been to produce a double plug. Thus, U.S. Pat. No. 3,306,870 to Eilers et al. discloses injecting an aqueous solution of an acrylamide polymer and a material which reacts with the polymer to form a first plug. The composition may be preceded or followed by a slurry of an expansive hydraulic cement which reacts in the formation to form a second plug.

In spite of the wide variety of plug-forming compositions and methods previously suggested, need remains for even more effective plugging materials, especially for use in formations having channels or zones of high permeability which are especially difficult to seal off.

Accordingly, a principal object of this invention is to provide a method for controlling the permeability of a subterranean formation of nonuniform permeability.

Another object of the invention is to provide a method for reducing channeling of a flooding medium from an injection well to a producing well via a zone of high permeability.

Still another object is to provide a method for selectively plugging water-producing zones in a subterranean formation.

A further object is to plug especially onerous and difficult to plug high permeability channels in a substerranean formation.

A still further object is to provide a combination of two plugging materials which together plug high permeability channels in a subterranean formation.

Other objects, advantages and features of the invention will become apparent from the following description and appended claims.

SUMMARY OF THE INJECTION

A method of plugging the more permeable zones of a subterranean formation penetrated by a well to control the path of flow of fluids through the formation in which there is injected into the formation: (1) an aqueous solution or dispersion of a polymer and a material that reacts with the polymer within the formation to produce a polymer-containing plug, and (2) an aqueous solution of an alkali metal silicate and a material that reacts with the silicate within the formation to form a silicate-containing plug. It is preferred to inject a slug of an inert aqueous spacer between each slug of reactant chemical.

DETAILED DESCRIPTION OF THE INVENTION

In the plugging of the more permeable zones of a subterranean formation having heterogeneous permeability according to the method of this invention, a combination of two plug-forming compositions is injected into the formation via a well penetrating the formation. The first injected composition is an aqueous solution or dispersion of a polymer and a material which reacts therewith when the composition is positioned within the formation to produce a polymer-containing plug. The polymer and the material which reacts therewith may be admixed in an aqueous solution at the surface and injected together or aqueous solutions of the two reactants may be injected separately in any order. The second injected composition is an aqueous solution of an alkali metal silicate and a material which reacts therewith when the composition is positioned within the formation to produce a silicate-containing plug. The alkali metal silicate and the material which reacts therewith are admixed in an aqueous solution at the surface and injected together.

The aqueous polymer solution employed in the first stage of the treatment of this invention is a dilute solution of a water-soluble or water-dispersible polymer in fresh water or brine. A number of water-soluble polymers are known to form viscous aqueous polymer solutions when dissolved therein in relatively dilute concentrations. Exemplary water-soluble polymeric materials that can be employed are relatively high molecular weight acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscometer equipped with a UL adapter and operated at a speed of 6 rpm. However, it is to be recognized that other of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$ to $40 \times 10^6$ and more preferably from $3 \times 10^6$ to $10 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide", as employed herein, is inclusive of the modified polymers wherein the carboxyl groups are in the acid form and also of such polymers wherein the carboxyl groups are in the salt form, provided that the salts are water-soluble. Alkali metals and ammonium salts are preferred. A number of polyacrylamides and partially hydrolyzed acrylamide polymers and acrylic acid-acrylamide copolymers suitable for use in this invention are commercially available; for example, WC-500 from Calgon Corporation of Pittsburgh, Pa., Pusher 700 from The Dow Chemical Company of Midland, Mich., and Q-41-F from Nalco Chemical Company of Oak Brook, Ill.

Especially useful in the practice of this invention are the at least partially cationic polyacrylamides, the at least partially anionic polyacrylamides and mixtures thereof. A partially cationic polyacrylamide is a nonionic polyacrylamide which contains a cationic comonomer, such as an alkylene polyamine, a quaternary ammonium chloride or amine hydrochloride, for example trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be a nonionic polyacrylamide which has been partially hydrolyzed to convert some of the acrylamide groups to acrylic groups, the alkali metal salts of which are anionic. Introducing sulfate or sulfonate groups into the polyacrylamide molecule also imparts an anionic character to the molecule. WD-120 is a 20 percent by weight cationic, 80 percent nonionic copolymer from Betz Laboratories, Inc. of Trevose, Pa. WD-160 and Hi Vis are 40 percent anionic, 60 percent nonionic polyacrylamides which have been partially hydrolyzed to the extent of 35 percent. These polymers are also from Betz Laboratories, Inc.

The operable polyalkeneoxides have molecular weights in the range of from about $10^5$ to about $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is made commercially by Union Carbide Chemicals Company under the trade name "Polyox". Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

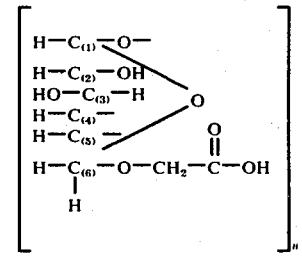

where $n$ is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the H at the end of the carboxymethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may possibly contain up to three carboxymethyl groups, the additional carboxymethyl groups being substituted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 and 0.9.

Hydroxyethylcellulose can be prepared from shredded wood pulp which has been soaked in 30 weight percent sodium hydroxide for about 20 hours. The resultant alkali cellulose is reacted with either ethylene oxide or ethylene chlorohydrin until a sufficient number of ethylene groups per glucose unit have been combined. The water-soluble form of hydroxyethylcellulose useful in this invention has a substitution (hydroxyethyl groups per glucose unit) greater than about 0.5, and preferably from 1.0 to 2.0. This is in contrast to the alkali-soluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and viscosity ranges from about 10 to 1200 centipoises. A very high molecular weight compound suitable for use in this invention is marketed by Hercules Inc. as Natrosol 250. Other suitable products are marketed, as under the name Cellosize, products of the Union Carbide Chemicals Company.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens*. Of these, ionic polysaccharide B-1459 is preferred. The polysaccharide B-1459 is prepared by culturing the bacterium *Xanthomonas campestris* NRRL B-1459, U.S. Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trade name Kelzan MF from Kelco Company of San Diego, Cal. Production of this heteropolysaccharide is well described in Smiley, K. L. "Microbiol Polysaccharides—A Review". *Food Technology* 20, 9:112–116 (1966) and Moraine, R. A., Rogovin, S. P. and Smiley, K. L. "Kinetics of Polysaccharide B-1459 Synthesis", *J. Fermentation Technology* 44, 311–312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the formation into which they are to be injected is water-sensitive or where fresh water is not available. In most instances, the mobility of the water can be reduced to the desired level by the addition of about 0.001 to about 1 weight percent of the polymer, and satisfactory results can often be obtained by the addition of 0.05 to 0.15 weight percent of polymer.

The material which reacts with the polymer within the formation to produce a polymer-containing plug can be any one or a mixture of a number of materials. Generally such materials are those which at least partially cross-link the polymer to form a gelatinous precipitate. Suitable cross-linking agents include mixtures of a compound of a multivalent metal and a reducing agent, or a low molecular weight water-soluble aldehyde, or a colloidal hydroxide of a multivalent cation. Mixtures of the various types of cross-linking agents may also be used.

Where the cross-linking agent is a mixture of a compound of a multivalent metal and a reducing agent, suitable multivalent metal compounds are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates and chromium trioxide. Sodium dichromate and potassium dichromate are preferred because of their low cost and ready availability. The hexavalent chromium in the chromium compounds is reduced in situ to trivalent chromium by suitable reducing agents, as discussed hereinafter. In the permanganate compounds, the manganese is similarly reduced from +7 valence to +4 valence as in $MnO_2$. As a general rule, there is used from 0.05 to 60, preferably 0.5 to 30, weight percent multivalent metal-containing compound based on the amount of polymer used. Stated another way, the amount of the starting multivalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer.

Suitable reducing agents which can be used in this combination include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide and others. Nonsulfur-containing reducing agents which may be used include hydroquinone, ferrous chloride, p-hydrazinobenzoic acid, hydrazine phosphite, hydrazine dichloride and the like. The most preferred reducing agents are sodium hydrosulfite and potassium hydrosulfite. The amount of reducing agent used will generally be within the range of from 0.1 to at least 150, preferably at least about 280, weight percent of the stoichiometric amount required to reduce the metal in the starting multivalent state to the lower valence state, e.g., +6 Cr to +3 Cr.

When a low molecular weight water-soluble aldehyde is used as the cross-linking agent, formaldehyde, paraformaldehyde or glyoxal may be used as well as derivatives thereof, such as hexamethylenetetramine, which can produce formaldehyde or glyoxal in an acidic solution. Aldehydes will cross-link the water-soluble polymers at a pH of about 3 or lower. Generally, the more acid the pH, the more rapid the cross-linking. The amount of the aldehyde cross-linking agent can be varied from about 0.01 to about 50 percent based on the weight of the polymer present in the aqueous solution.

When the cross-linking agent is a colloidal hydroxide of a polyvalent cation, there is utilized a polyvalent ion, such as aluminum, chromium, copper, iron, cadmium, cobalt, manganese, nickel, tin or zinc in the form of water-soluble salts, such as sulfates, chlorides and the like at a pH sufficiently low to retain the ions in solution. The formation contacted by the treating solution acts as a buffer in that it gradually raises the pH, thereby precipitating the hydroxide of the above-mentioned ions which react with the polymer. Generally an aqueous solution containing from 0.005 to 5.0 weight percent of inorganic ion based on the weight of polymer can be used.

The composition used to form the second plugging material used in the process of this invention is an aqueous liquid mixture of two or more reactive chemical agents which react in the formation to form a precipitate or gel. One reactive chemical agent is an alkali metal silicate. The other reactive chemical agent is a gelling agent for the alkali metal silicate. Sodium silicate is the most commonly used alkali metal silicate. The gelling agent can be an acid or acid-forming compound, a water-soluble ammonium salt, a lower aldehyde, an aluminum salt or an alkali metal aluminate. Exemplary gelling agents are sulfuric acid, hydrochloric acid, ammonium sulfate, formaldehyde, aluminum sulfate and sodium aluminate. The silicate reacts in the presence of the gelling agent to form a silica or silica alumina gel. It is well known that the gelling of sodium silicate in the presence of these gelling agents is delayed, i.e., gelling occurs at some time after the silicate and gelling agent are admixed. It is preferred that the conditions be selected in accordance with known techniques to delay gelling of the sodium silicate for a period sufficient to permit its injection into the reservoir immediately adjacent the well, but yet not for a period that would unduly prevent continuance of normal well operations. Thus, in most cases, it is preferred that the conditions be selected so that gelling is delayed for about 2 hours, and is subsequently completed within about 24 hours.

The concentration of alkali metal silicate in the plugging solution can vary over a wide range, e.g., from about 1 to 30 weight percent. However, weaker plugs are formed at the more dilute concentrations and costs are often excessive at higher concentrations. Thus, it is preferred that the alkali metal silicate concentration of the plugging solution injected into the formation be between about 3 and 15 weight percent and preferably between about 3 and 10 weight percent. The ratio of silica to alkali metal oxide in the silicate can also vary within limits from about 1.5 to 1 to about 4 to 1 by weight. Preferably, however, the ratio should be from about 3 to 1 to about 3.5 to 1, i.e., if it is preferred that the alkali metal silicate solution contain 3 to 3.5 parts by weight of silica per part of alkali metal oxide.

The concentration of gelling agent employed can vary over a wide range depending on such variables as the particular gelling agent used, the pH of the system and the gel time desired. In general, an aqueous solution containing from about 1 part by weight gelling agent per each part by weight alkali metal silicate used in satisfactory.

In the practice of the treating method of this invention, there is first introduced into a heterogeneous or highly stratified reservoir a quantity of the aqueous polymer solution sufficient to penetrate into the more permeable strata of the reservoir a substantial distance from the injection well. It is preferred that the aqueous polymer solution penetrate into the more permeable strata a distance of at least about 20 feet from the injection well, and more preferably a distance of about 50 feet, although it is recognized that in some cases sufficient polymer solution can be injected to pass through the formation to one or more spaced production wells, which can be located several hundred feet or more from the injection well. It should be understood that the polymer solution will penetrate into the less permeable zones to a much lesser extent, the amount of polymer solution entering each stratum depending upon the permeability of the individual stratum in relation to the permeabilities of all the strata.

The amount of polymer solution required to obtain the desired treatment will vary from well to well and can best be determined from a knowledge of the reservoir characteristics obtained from well logs, core analysis, injection profiles and tracer studies. Nevertheless, it is found that satisfactory results can often be obtained by the injection of about 5 to 200 barrels of aqueous polymer solution per vertical foot of formation to be treated. The material which reacts with the polymer within the formation to produce a polymer-containing plug may be admixed with the aqueous polymer solution at the surface, preferably shortly before the solution is injected into the formation, or it may be injected in an aqueous solution as a separate slug either before or after the injection of the aqueous polymer solution. In the case of the separate injection of the polymer solution and the cross-linking agent solution, mixing of the two reactants occurs after the two solutions are in the formation. When the polymer solution and the cross-linking agent solutions are injected separately, it is sometimes advantageous to utilize a slug of an inert spacer liquid, such as fresh water or brine, which is injected between the two slugs of reactive chemicals to keep the reactive chemicals from coming into contact until they are out in the formation where the spacer slug tends to dissipate. Generally a spacer slug of from 1 to 10 barrels per vertical foot of interval to be treated is adequate; however, the exact volume of water injected in this step is not usually critical. A similar inert spacer slug of similar size can be used to separate the composition or compositions injected to form the polymer-containing plug from the composition subsequently injected to form the silicate-containing plug.

The amount of the solution of alkali metal silicate and gelling agent required can also vary over a wide range. In general, there is used from about 1 to about 10 barrels of aqueous solution of alkali metal silicate and gelling agent per vertical foot of formation to be treated. The alkali metal silicate and gelling agent can be mixed into the same aqueous solution at the surface and injected into the well as a single slug or they can be injected as separate aqueous solutions in any desired order. When the two components are injected in separate solutions, it is preferred that the first injected slug contain from about 0.001 to 1 weight percent of one of above-mentioned water-soluble or water-dispersible polymers as a thickening agent. This thickened solution then tends to move through the formation at a slower rate than the second injected slug and mixing of the two slugs in the formation is enhanced.

After the combination treatment of this invention wherein there is formed in the heterogeneous formation first a polymer-containing plug and then a silicate-containing plug, the treated well can be returned to its intended use, such as for production of oil or for injection of secondary or tertiary recovery fluids. During this subsequent passage of fluids through the formation during production or injection, the fluids tend to pass through the less permeable portions of the formation rather than through the more permeable portions of the formation which are occupied by the plugging materials.

The combination of the two plugging compositions effectively plugs high permeability channels which have been difficult to plug with previously used plugging agents. While the reasons that this particular combination forms a superior plug are largely unknown and speculative, it is believed that each plugging material has certain unique characteristics that, in combination, act together to form a more effective plug than does either plugging material used separately. For example, the polymer-containing plug appears to penetrate a greater distance into the formation than does the silicate-containing plug. The silicate-containing plug seems to form a stronger plug than the polymer-containing plug and reduces the erosion of the latter by fluids subsequently produced from or injected into the formation.

The invention is further described by the following examples which are illustrative of specific modes of practicing the invention and are not intended as limiting the scope of the invention as defined by the appended claims.

EXAMPLE 1

This example illustrates the plugging of a heterogeneous formation by the method of this invention. A 1½ inch diameter, 5½ inch long unconsolidated core having heterogeneous permeability from the Dominguez Field, California, is mounted in a plastic core holder equipped with pressure fittings on its opposite end faces so that desired liquids can be forced lengthwise through the core. A 1½ inch diameter, ½ inch thick synthetic aloxite porous aluminum oxide end plate is placed over each end of the core. The core is prepared by first saturating it with tap water. The permeability to water, $K_{water}$, is calculated to be 1,915 millidarcies (md.). The core is then resaturated with filtered Dominquez Field crude oil to provide an oil saturation of 75 percent. The core is next flooded with a 500 parts per million sodium chloride brine at a pressure of 10 pounds per square inch (p.s.i.) until substantial water breakthrough is observed as evidenced by a sharp increase in the produced water/oil ratio. The permeability to water measures 360 md.

The core is then treated with polymer and cross-linking agent by injecting therein 1.4 pore volume of a 0.42 percent by weight aqueous solution of WD-120, a 20 percent cationic, 80 percent nonionic copolymer of acrylamide and acrylate, containing 0.015 percent by weight sodium bisulfite, followed by 0.75 pore volume of a 0.15 percent by weight aqueous solution of WD-160, an 40 percent anionic, 60 percent nonionic polyacrylamide which has been partially hydrolyzed to the extent of 35 percent, containing 0.05 percent by weight sodium dichromate. The permeability of the core is reduced to 8.8 millidarcies (md.). The core is then treated with silicate and gelling agent by injecting therein 0.75 pore volume of a 7 percent by weight ammonium sulfate solution containing 0.15 percent by weight WD-160 (as a thickener) in fresh water and 0.75 pore volume of a 7 percent by weight sodium silicate. The sodium silicate solution is an aqueous commercial sodium silicate containing about 37.6 percent by weight sodium silicate and having a silica to sodium oxide ($SiO_2/Na_2O$) ratio of 3.22 marketed by Philadelphia Quartz Company under the designation N-grade sodium silicate solution. The permeability of the core is further reduced to 1.1 md. Thus the core is essentially plugged.

While the foregoing test is indicative of the overall operability of the process, the particular volumes of treating agents employed are not necessarily exemplary of the volumes of treating agents employed in a commercial scale treatment under field conditions.

While particular embodiments of the invention have been described, it will be understood that the invention is not limited thereto since many modifications can be made and it is intended to include within the invention any such embodiments as fall within the scope of the claims.

The invention having been thus described, I claim:

1. A method for reducing the permeability of the higher permeability strata or channels of a heterogeneous subterranean formation penetrated by a well comprising:
  a. injecting through said well and into said formation about 5 to 200 barrels per vertical foot of strata to be treated of (1) an aqueous solution or dispersion of relatively high molecular weight polymers selected from the group consisting of acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar, and (2) an aqueous solution of a cross-linking agent selected from the group consisting of mixtures of a compound of a multivalent metal and a reducing agent, a low molecular weight water-soluble aldehyde, and a colloidal hydroxide of a polyvalent cation, said aqueous solution of said cross-linking agent being injected preceding or following said aqueous solution or dispersion of high molecular weight polymer, or said aqueous solution of said cross-linking agent being admixed with said aqueous solution or dispersion of said high molecular weight polymer; and
  b. thereafter injecting from about 1 to 10 barrels per vertical foot of strata to be treated of (1) an aqueous solution of an alkali metal silicate and (2) an aqueous solution of a gelling agent selected from the group consisting of acid and acid-forming compounds, water-soluble ammonium salts, lower aldehydes, aluminum salts and alkali metal aluminates, said aqueous solution of said gelling agent being injected preceding or following said aqueous solution or said gelling agent being admixed with said aqueous solution of said alkali metal silicate.

2. The method defined in claim 1 wherein said relatively high molecular weight polymer is employed at a concentration of from about 0.001 to about 1 percent by weight of the aqueous solution.

3. The method defined in claim 1 wherein said cross-linking agent is a mixture of a compound of a multivalent metal at a higher valence state and a reducing agent capable of reducing the multivalent metal to a lower valence state, and wherein the compound of the multivalent metal is employed at a concentration of from about 0.05 to 60 percent by weight of the polymer and the reducing agent is employed at a concentration of from about 0.1 to 150 percent by weight of the stoichiometric amount required to reduce the multivalent metal from said higher valence state to said lower valence state.

4. The method defined in claim 1 wherein said cross-linking agent is a low molecular weight water-soluble aldehyde employed at a concentration of from about 0,01 to 50 percent by weight of the polymer.

5. The method defined in claim 1 wherein said cross-linking agent is a colloidal hydroxide of a polyvalent cation employed at a concentration of from about 0.005 to 5 percent by weight of the polymer.

6. The method defined in claim 1 wherein said polymer solution and said cross-linking agent solution are admixed at the surface before injection into the formation.

7. The method defined in claim 1 wherein said polymer solution and said cross-linking agent solution are injected into the formation as separate slugs.

8. The method defined in claim 7 wherein said slug of polymer solution and said slug of cross-linking agent solution are separated by a slug of inert aqueous spacer liquid.

9. The method defined in claim 1 wherein said alkali metal silicate is sodium silicate.

10. The method defined in claim 1 wherein said aqueous solution of alkali metal silicate contains from about 1 to 30 weight percent of said alkali metal silicate.

11. The method defined in claim 1 wherein said gelling agent is ammonium sulfate.

12. The method defined in claim 1 wherein said gelling agent is employed at a concentration of one part by weight gelling agent per each part weight alkali metal silicate employed.

13. The method defined in claim 1 wherein the alkali metal silicate solution and the gelling agent solution are admixed at the surface before injection into the formation.

14. The method defined in claim 1 wherein the alkali metal silicate solution and the gelling agent solution are injected into the formation as separate slugs.

15. The method defined in claim 14 wherein the slug of alkali metal silicate solution and the slug of gelling agent solution are separated by a slug of inert aqueous spacer liquid.

16. The method defined in claim 14 wherein the first injected of the slug of alkali metal silicate solution and the slug of gelling agent solution contains from about 0.001 to 1 weight percent of a water-soluble or water-dispersible polymer thickener.

17. The method as defined in claim 1 wherein the relatively high molecular weight polymer is selected from the class consisting of an at least partially cationic polyacrylamide, an at least partially anionic polyacrylamide which has been partially hydrolyzed, and mixtures thereof.

18. In a method for the recovery of oil from a subterranean oil reservoir having heterogeneous permeability and which is in communication with at least one producing well and at least one injection well, which method includes injection into the reservoir of a secondary or a tertiary recovery fluid via an injection well and recovery of oil via a production well, the improvement which comprises at some point during the injection of the secondary or tertiary recovery fluid:
  a. injecting from about 5 to about 200 barrels per vertical foot of strata to be treated of an aqueous solution or dispersion of relatively high molecular weight polymers selected from the class consisting of acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar, and an aqueous solution of a cross-linking agent selected from the class consisting of mixtures of a compound of a multivalent metal and a reducing agent, a low molecular weight water-soluble aldehyde, and a colloidal hydroxide of a polyvalent cation, and
  b. thereafter injecting from about 1 to 10 barrels per vertical foot of strata to be treated of an aqueous solution of an alkali metal silicate and an aqueous solution of a gelling agent selected from the group consisting of acid and acid-forming compounds, water-soluble ammonium salts, lower aldehydes, aluminun salts and alkali metal aluminates.

19. The method defined in claim 18 wherein the relatively high molecular weight polymer is employed at a concentration of from about 0.001 to about 1 percent by weight of the aqueous solution.

20. The method defined in claim 18 wherein the cross-linking agent is a mixture of a compound of a multivalent metal and a reducing agent wherein the compound of a multivalent metal is employed at a concentration of from about 0.05 to 60 percent by weight of the polymer and the reducing agent is employed at a concentration of from about 0.1 to 150 percent by weight of the stoichiometric amount required to reduce the metal in a starting polyvalent state to a lower polyvalent state.

21. The method defined in claim 18 wherein the cross-linking agent is a low molecular weight water-soluble aldehyde employed at a concentration of from about 0.01 to 50 percent by weight of the polymer.

22. The method defined in claim 18 wherein the cross-linking agent is a colloidal hydroxide of a polyvalent cation employed at a concentration of from about 0.005 to 5 percent by weight of the polymer.

23. The method defined in claim 18 wherein the polymer solution and the cross-linking agent solution are admixed at the surface before injection into the formation.

24. The method defined in claim 18 wherein the polymer solution and the cross-linking agent solution are injected into the formation as separate slugs.

25. The method defined in claim 24 wherein the slug of polymer solution and the slug of cross-linking agent solution are separated by a slug of inert aqueous spacer liquid.

26. The method defined in claim 18 wherein the alkali metal silicate is sodium silicate.

27. The method defined in claim 18 wherein the alkali metal silicate is employed at a concentration of from about 1 to 30 weight percent of the aqueous solution.

28. The method defined in claim 18 wherein the gelling agent is ammonium sulfate.

29. The method defined in claim 18 wherein the gelling agent is employed at a concentration of one part by weight gelling agent per each part by weight alkali metal silicate employed.

30. The method defined in claim 18 wherein the alkali metal silicate solution and the gelling agent solution are admixed at the surface before injection into the formation.

31. The method defined in claim 18 wherein the alkali metal silicate solution and the gelling agent solution are injected into the formation as separate slugs.

32. The method defined in claim 31 wherein the slug of alkali metal silicate solution and the slug of gelling agent solution are separated by a slug of inert aqueous spacer liquid.

33. The method defined in claim 31 wherein the first injected of the slug of alkali metal silicate solution and the slug of gelling agent solution contains from about 0.001 to 1 weight percent of a water-soluble or water-dispersible polymer thickener.

34. The method defined in claim 18 wherein the relatively high molecular weight polymer is selected from the class consisting of an at least partially cationic polyacrylamide, an at least partially anionic polyacrylamide which has been partially hydrolyzed, and mixtures thereof.

* * * * *